United States Patent [19]
Field, Jr.

[11] Patent Number: 5,168,528
[45] Date of Patent: Dec. 1, 1992

[54] DIFFERENTIAL ELECTRONIC IMAGING SYSTEM

[75] Inventor: Robert J. Field, Jr., Fincastle, Va.

[73] Assignee: ITT Corporation, New York, N.Y.

[21] Appl. No.: 569,206

[22] Filed: Aug. 20, 1990

[51] Int. Cl.$^5$ ............................................. G06K 9/28
[52] U.S. Cl. ....................................... 382/1; 250/332; 358/113; 382/22; 382/68
[58] Field of Search .......................... 382/1, 68, 50, 22; 358/113, 125, 126; 356/51; 455/609; 250/332, 334, 208.1

[56] References Cited

U.S. PATENT DOCUMENTS

| | | | |
|---|---|---|---|
| 4,707,859 | 11/1987 | Nudd et al. | 382/68 |
| 4,868,389 | 9/1989 | Moore | 358/113 |
| 4,999,614 | 3/1991 | Ueda et al. | 358/113 |

*Primary Examiner*—Leo H. Boudreau
*Attorney, Agent, or Firm*—Arthur L. Plevy

[57] ABSTRACT

A differential electronic imaging system has a diode array camera and a plurality of A/D processing circuits connected to the respective diode pixel elements in parallel. The A/D processing circuits are operated in successive frame periods including a first partial period for processing an object-plus-FBP image and a second partial period for processing a fixed background pattern (FBP) image, in order to derive digital differential image data representing the object image alone. The use of parallel processing eliminates the bottleneck of conventional serial processing of the pixels of the image plane, and permits better sensitivity and image resolution. The use of the A/D processing circuits for direct conversion of the object-plus-FBP image minus the FBP image in each frame period eliminates readout noise, high frequency noise errors, FBP drift errors, and storage requirements for the FBP image. Other features include a chopper section synchronized to the clock cycle for each frame period, which also selectively controls a laser source for applications of the system as a target locator.

26 Claims, 8 Drawing Sheets (INTERFEROMETER SYSTEM)

FIG. 2A, 2B: * = FBP STORAGE PATH

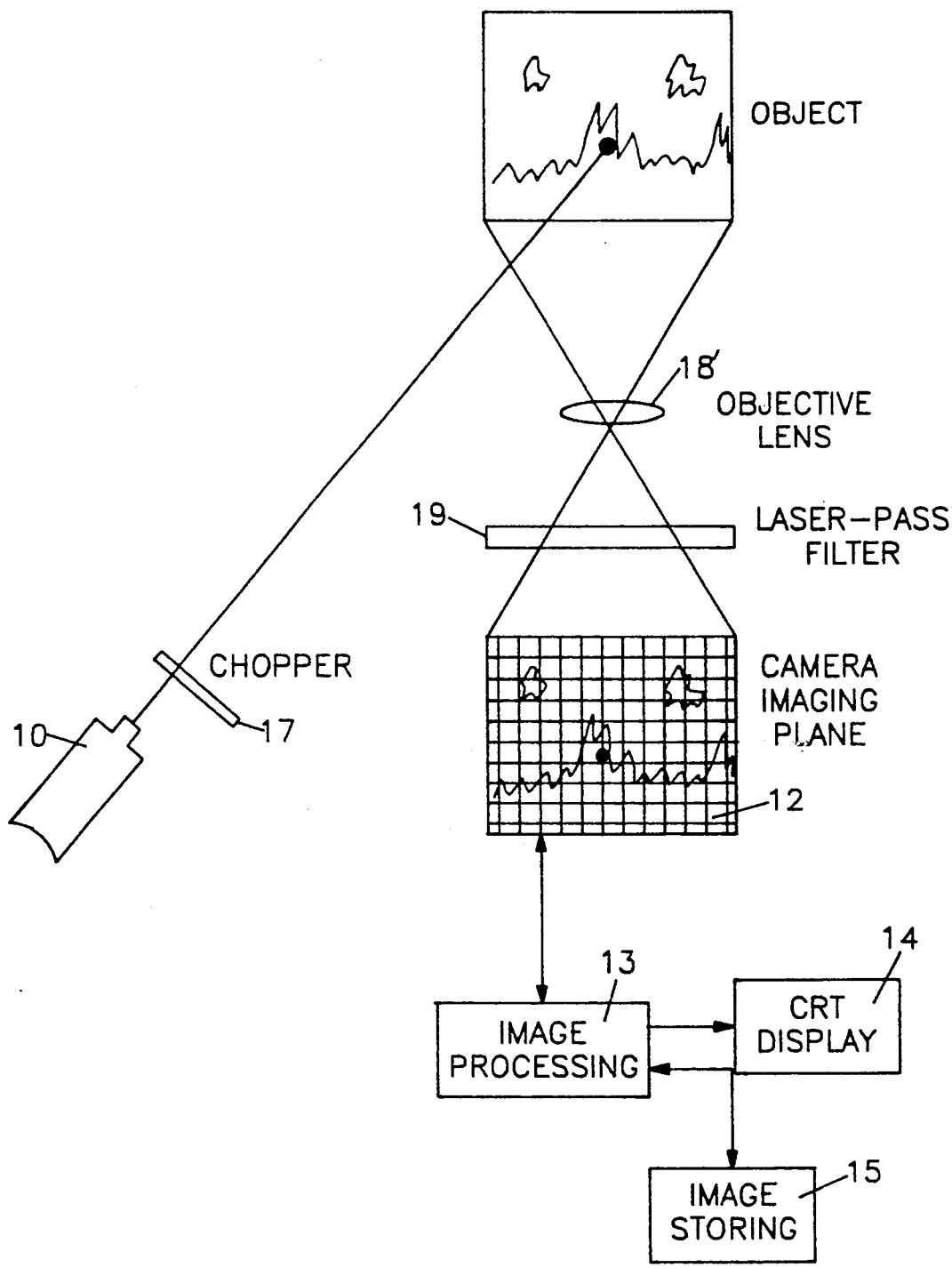

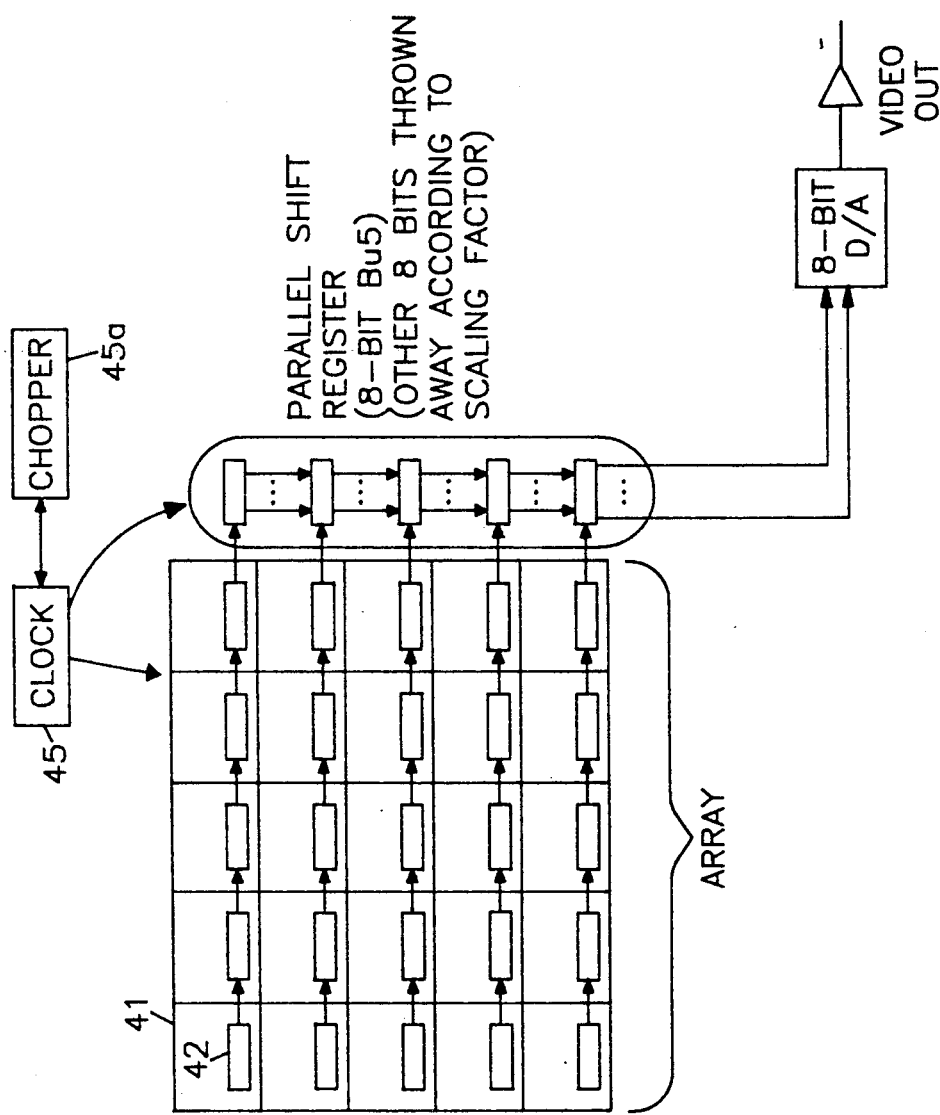

DIFFERENTIAL ELECTRONIC IMAGING SYSTEM

FIELD OF INVENTION

The present invention relates to an electronic imaging system, and more particularly, to an electronic image processing circuit for a differential imaging system.

BACKGROUND OF INVENTION

Electronic, and particularly digital, processing circuits have been developed to store, retrieve and enhance the display of optical images, especially where the object being captured is difficult to image, or the image and transmission medium are characterized by distortions or noise. As one particular example, a new type of thermal imaging system, called a "Thermodynamics Infrared Imaging Sensor", has been developed to capture images of the heat pattern of an object, such as for night vision or target identification. Such thermal imaging systems are described, for example, in U.S. Pat. No. 4,788,428 to Metcalf et al., which is incorporated herein by reference.

As illustrated in FIG. 1, a typical thermal imaging system employs a laser beam from a laser source 10 which is passed through a large-area interferometer 11 which includes an imaging mirror 16 that is subtly deformed by infrared energy from the object imaged on the mirror 16 through an infrared (IR) objective lens 18. The heat patterns of the object are thus used to modulate the transmitted laser beam. Laser light reflected from the mirror 16 and the interference beam are combined to generate an interference pattern at a camera image plane 12 of the interferometer 11. The interference pattern at the camera image plane 12 corresponding to the thermal image is read by a camera or detector 12. The input image signals from the camera 12 are processed by an image processing circuit 13 to generate video signals to be displayed on a CRT 14 and/or stored in a storage unit 15.

A difficult technical problem for this and other, similar imaging systems is that the object may provide only a very faint image on a large, non-uniform fixed background pattern (FBP). Signal processing is required to subtract the FBP image in order to provide a readable differential image. However, the desired operational requirements for obtaining a differential image can impose a severe task on conventional signal processing systems because of low sensitivity and/or high noise. For example, the camera in the interferometer sensor for military applications is required to detect an image approximately 1000 times fainter than the FBP, for a sensitivity of one degree Centigrade difference. For a temperature difference sensitivity of 0.1 degree Centigrade, the image is approximately 10,000 times fainter than the FBP.

As shown in FIG. 3, another application of the camera 12 is as a laser targeting system. Such a system does not use a laser interferometer 11, and is not part of a passive infrared imaging system as shown in FIG. 1. Instead, the camera 12 is used to look directly for scattered light reflected from the object by a targeting laser 10. The light image from the object is focused by the objective lens 18' and filtered by the laser band filter 19 and passed to the camera image plane. The laser targeting system requires a very sensitive differential camera if the targeting laser light scattered from the object is much weaker than the general scene illumination (after narrow band filtering), e.g., particularly with a low-power targeting laser on a bright, sunny day. The filtered object input without the scattered laser light is referred to as the fixed background pattern (FBP). The FBP must be subtracted by the differential camera, just as in the interferometer imaging application. With the interferometer, however, the FBP is inherent within the imaging device, while in the targeting application, it is part of the input image signal of the object.

Conventional differential electronic imaging systems operate by storing an image of the FBP in electronic memory and subtracting it during system operation to yield the differential image. The FBP must be stored as a separate value for each pixel, since the expected non-uniformity in the FBP can be much greater than the image to be enhanced. Furthermore, the detection, storage, readout, and subtraction must be done with high accuracy and low noise due to the weakness of the signal compared to the FBP. A minimum of 12 bits of accuracy in FBP storage, and a maximum overall signal/noise difference of 4000 times are required for one degree Centigrade sensitivity in the interferometer application.

Examples of conventional schemes for differential image processing are illustrated in FIGS. 2A and 2B. The systems in FIGS. 2A and 2B require the FBP to be stored in digital form and retrieved for generating the differential image as a video output, using serial A/D and D/A signal conversions. Both systems use a PIN diode array camera 20, instead of a CCD camera, because of the lower readout noise level. The image plane captured by the PIN diode array 21 is scanned by an array scanning and video conversion unit 22. In the system of FIG. 2A, the object image and the FBP image are converted to digital form by the fast 12-bit A/D converter 23. The FBP digital data are stored in a RAM 24, and then retrieved for subtraction from the object image at the summing node 25 during system operation. The digital difference data are scaled and then converted to analog video signals by the 8-bit- D/A converter 26 for video output. In the system of FIG. 2B, only the FBP image is converted to digital form by the slow 12-bit A/D converter 23'. The stored FBP digital data are converted back to analog form by the fast 12-bit D/A converter 27, and subtracted from the analog object image signal at the summing node 28 for video output. The asterisks in the figures indicate the FBP storage path, which must be reset with an updated FBP image periodically, such as by switching off the object image with a chopper 17 as shown in FIG. 1 or FIG. 3.

The performance of systems using the PIN diode array camera, as shown in FIGS. 2A and 2B, is uncertain due to possibly unacceptable readout noise levels. Also, the analog subtraction scheme shown in FIG. 2B is problematic because the negative FBP video signal is regenerated from digital data, i.e. converted twice, and may not have the same shape between samples as the original image.

Furthermore, all of these schemes are subject to FBP drift after the FBP has been stored in memory. This can happen, for example, in the thermal imager if the system temperature changes unevenly. To prevent this, the system would have to be carefully constructed so that temperature changes would occur slowly enough to allow approximate equilibration across the image plane. Frequent recalibration of the FBP would be required using the chopper to switch from the object signal to the background.

Another serious problem is the data processing bottleneck of the 12-bit A/D and D/A converters. Each pixel requires one data conversion per video scan period. As a result, there is a direct tradeoff between the number of pixels, frame rate, and background subtraction accuracy (system sensitivity). For example, a 256×256 pixel system with one degree Centigrade sensitivity (requiring 12-bit accuracy), and a frame rate of 20/second, would require a data conversion time of 0.7 usec. This is at the upper speed limit for existing 12-bit D/A converters, thus making it difficult to implement and difficult to improve performance. Existing 12-bit A/D converters do not have this speed, so the scheme of FIG. 2A cannot be implemented at all at this performance level.

It is therefore a principal object of the invention to provide a differential electronic imaging system which has low noise, eliminates the data processing bottleneck, and permits high data conversion accuracy for better sensitivity and image resolution. It is a further object to provide a system which avoids the need for frequent FBP recalibration. A specific object also is to provide a highly sensitive differential imaging system which may be used to locate extremely weak signals in a strong FBP.

SUMMARY OF INVENTION

In accordance with the invention, a differential electronic imaging system comprises:
  an array formed with a plurality of photosensors arranged in a matrix, each of which receives input light for a respective pixel in an image plane of an input image and outputs an analog sensor signal in correspondence therewith;
  a plurality of sensor signal processing circuits, each of which is connected to a respective one of said plurality of photosensors and includes a signal conversion element for converting the analog sensor signal from the respective photosensor into corresponding differential image data, and data output means for outputting said differential image data; and
  display processing means for receiving the differential image data from the respective sensor signal processing circuits in order to generate a display corresponding to the input image.

In accordance with a particular aspect of the invention, the differential electronic imaging system further comprises:
  a clock for generating clock signals for controlling said sensor signal processing circuits in successive frame periods, each frame period including a first partial period for processing an object-plus-FBP image and a second partial period for processing a fixed background pattern (FBP) image, in order to derive the differential image data representing the object image alone; and
  said plurality of sensor signal processing circuits each employing a PIN diode as the respective photosensor for generating a current signal corresponding to the received image signal, a current controlled oscillator circuit receiving said current signal from said PIN diode and generating a pulse signal of a frequency corresponding to said current signal, an up/down counter controlled in accordance with the clock signals of said clock for counting up in correspondence with the frequency of a pulse signal generated during said first partial period for processing an object-plus-FBP image, for counting down in correspondence with the frequency of a pulse signal generated during said second partial period for processing an FBP image, and for outputting resulting digital differential image data for each frame period based upon said counting up and counting down.

Other subsidiary features of the differential electronic imaging system of the invention include a chopper section synchronized with the clock cycle for each frame period which interrupts the object-plus-FBP image to obtain the FBP-only image for subtraction in said second partial period.

BRIEF DESCRIPTION OF DRAWINGS

The above objects and further features and advantages of the invention are described in detail below in conjunction with the drawings, of which:

FIG. 3 shows a direct targeting laser system which is another application for the differential electronic camera;

FIGS. 6A and 6B are diagrams of an alternate embodiment of the differential electronic processing apparatus using parallel shift registers.

DETAILED DESCRIPTION OF PREFERRED EMBODIMENTS

Figure 1:
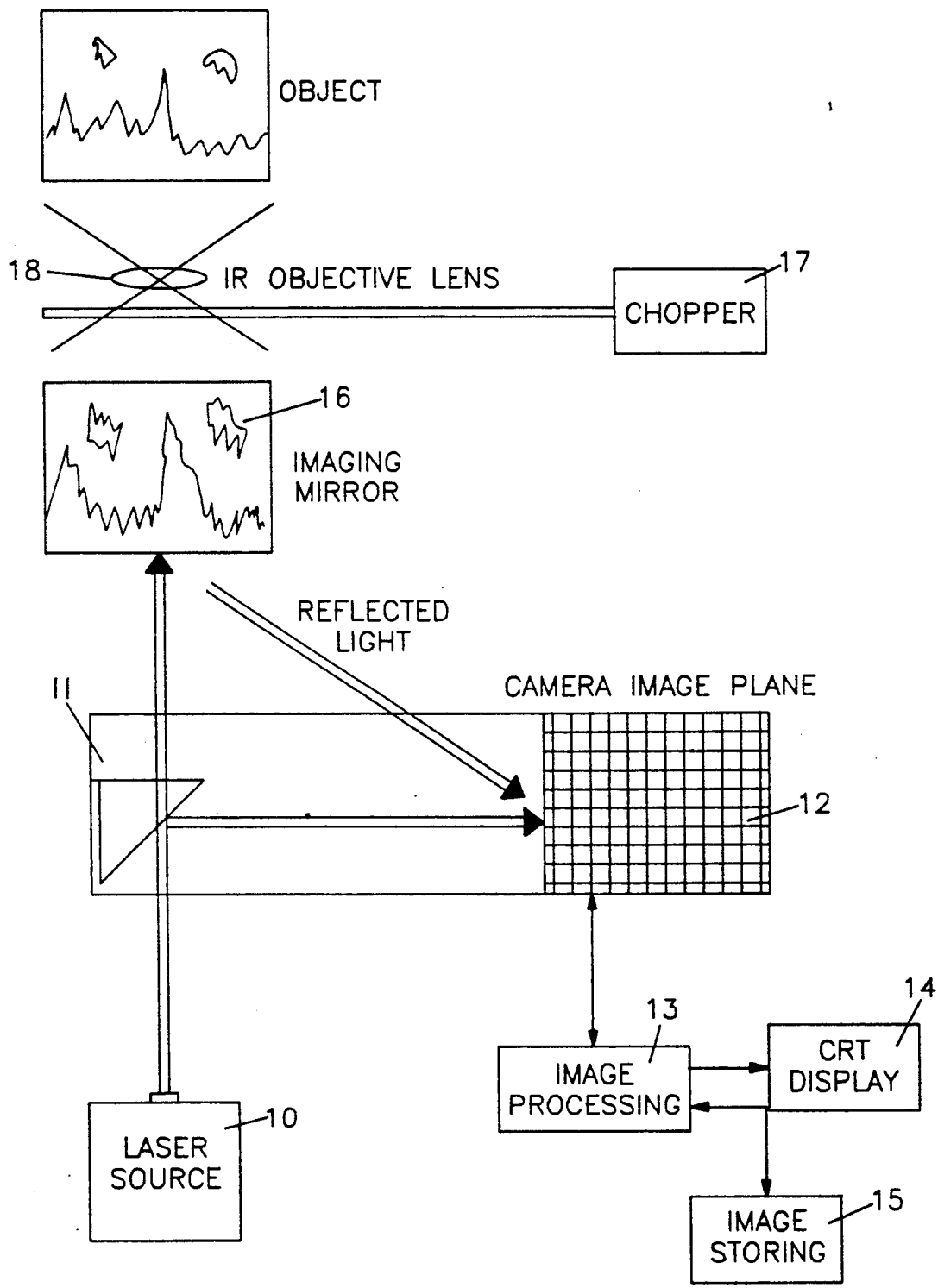
FIG. 1 shows an example of a conventional imaging system of the optical interference type using a laser beam to produce an interference pattern from an imaging mirror impinged by an image of an object.
Figure 2A:
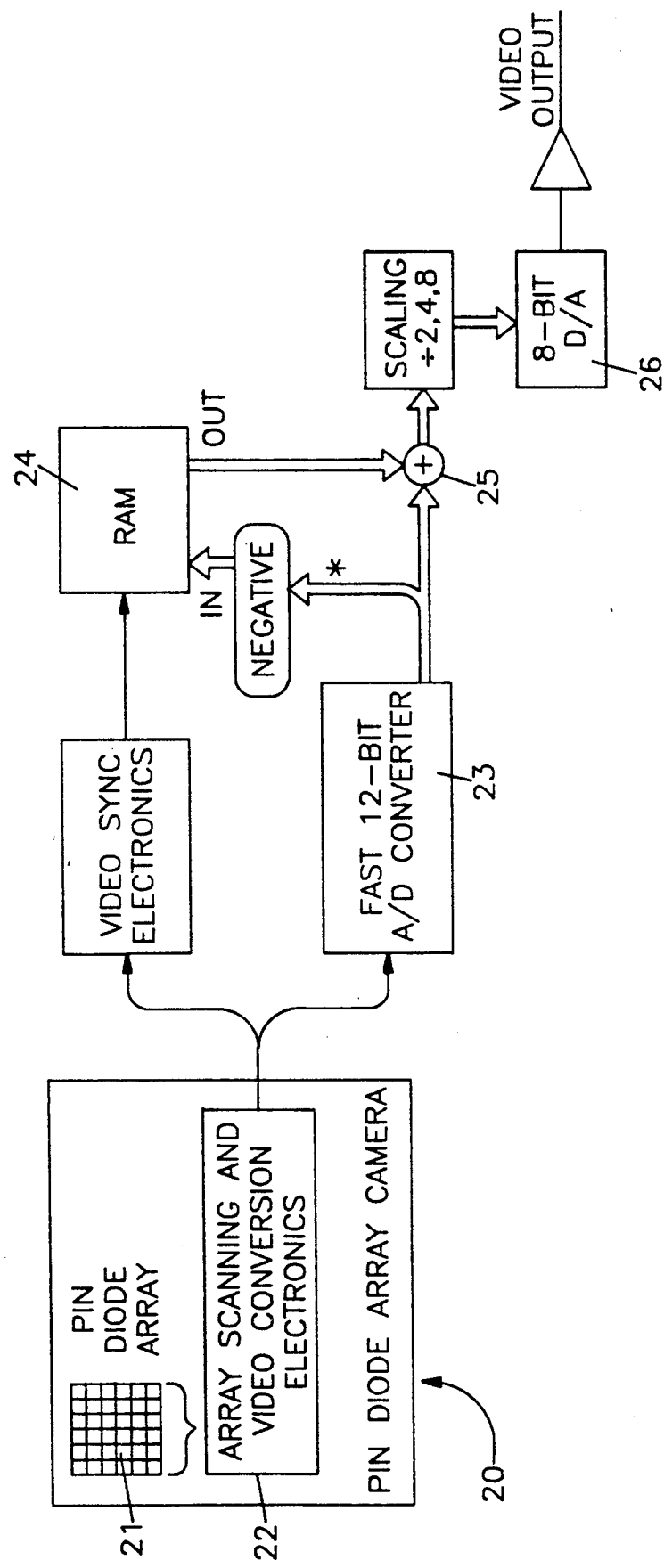
FIGS. 2A and 2B are diagrams of conventional differential electronic processing devices for an imaging system using a PIN diode array camera.
Figure 2B:
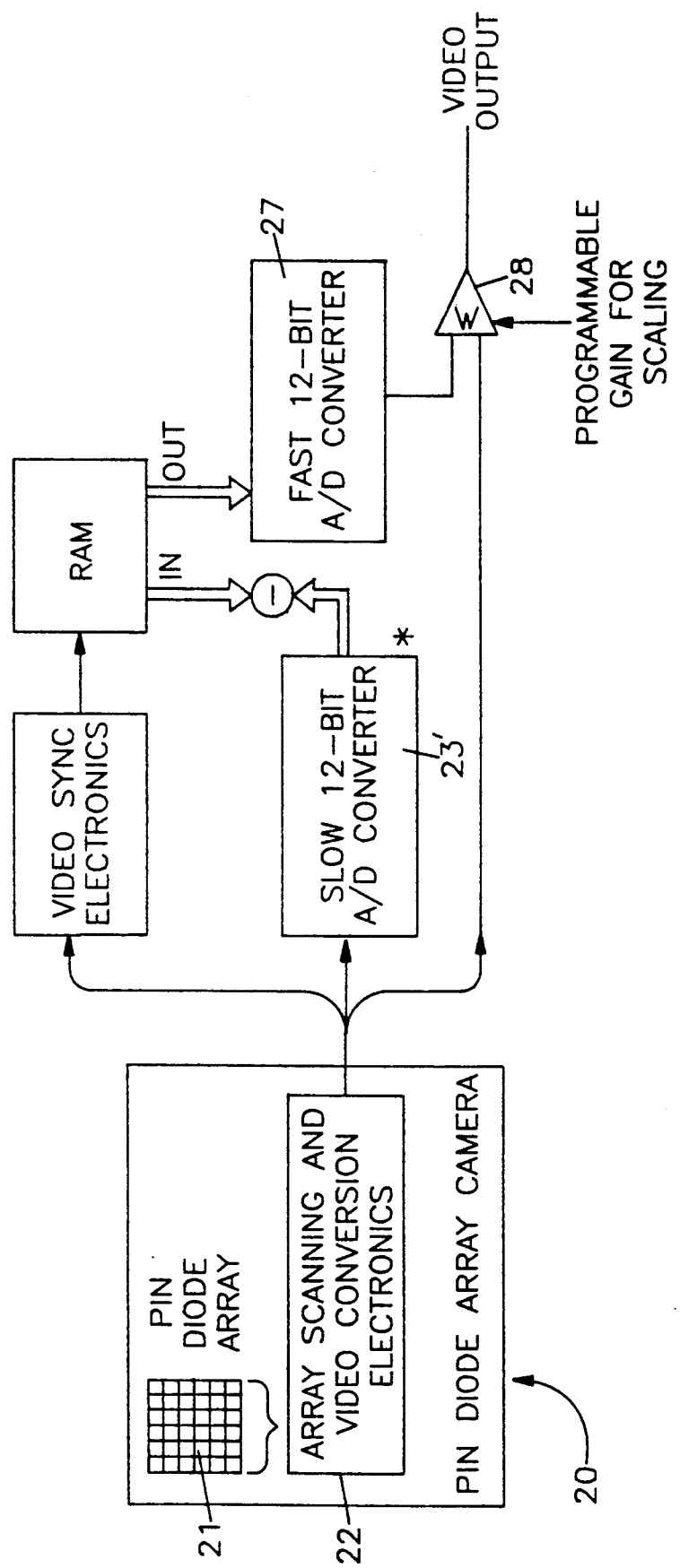

The differential electronic imaging system of the present invention is constructed to have low noise, high data processing speed, and high data conversion accuracy for better sensitivity and image resolution. It can therefore be used in a wide range of imaging applications, including the interferometer imaging system of FIG. 1 and the direct targeting system of FIG. 3. It is particularly useful under conditions where extremely weak object signals are to be located in a strong FBP.

Figure 4:
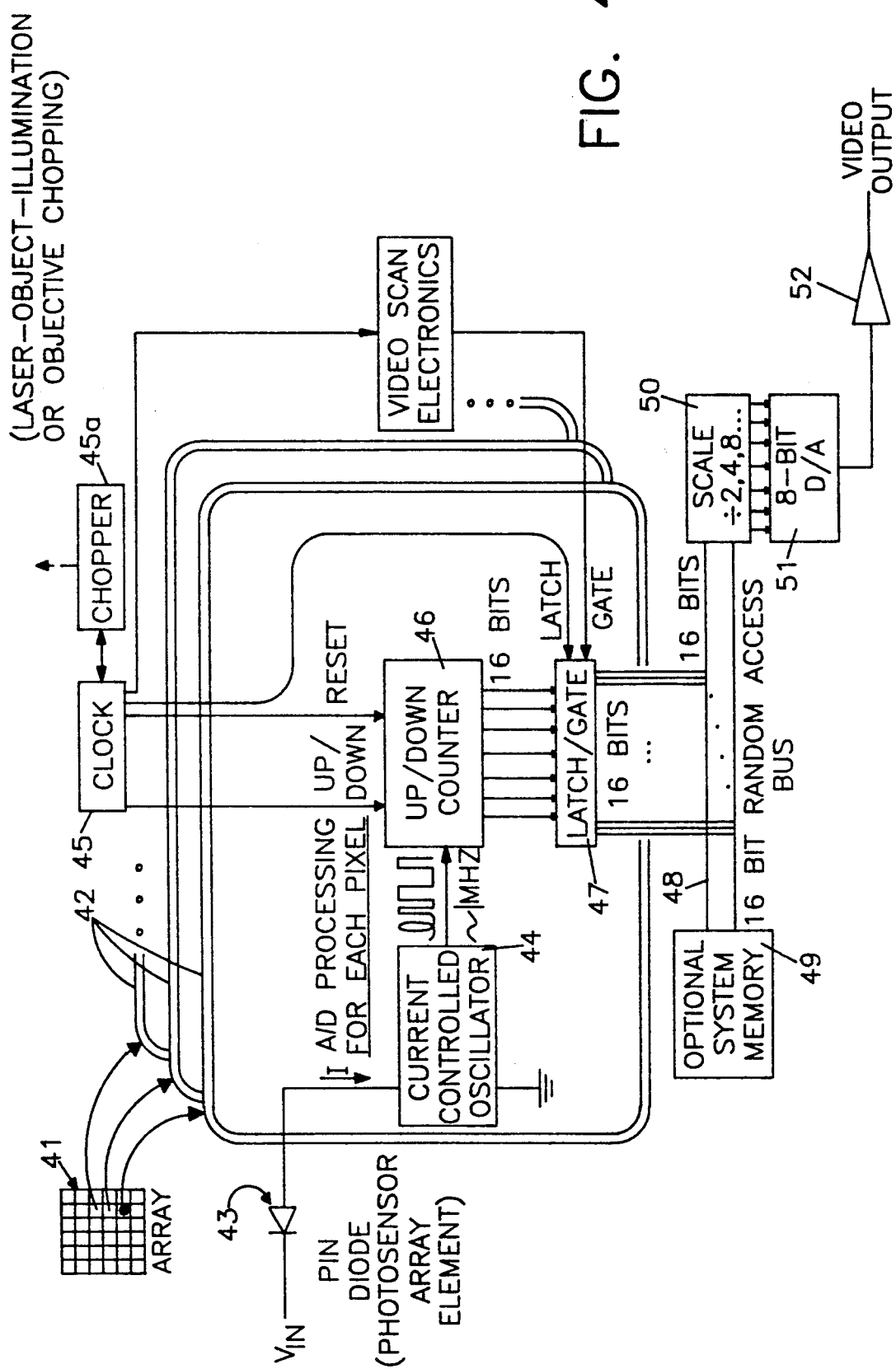
FIG. 4 is a diagram of a differential electronic processing apparatus for an imaging system in accordance with the invention.

Referring to FIG. 4, a differential electronic imaging system in accordance with the invention has a camera 41 having a matrix array of pixel elements corresponding to the image plane of an image to be processed, and a plurality of analog-to-digital (A/D) processing circuits 42, each of which is connected in parallel to a respective one of the array elements of the camera 41. The camera is preferably a PIN diode array camera having an X-Y matrix of photosensor elements. The PIN diode array may be separate from the A/D processing circuits, or they can be integrated therewith. In FIG. 4, the PIN diode array is shown as separate from the processing circuits. Each photosensor element 43 outputs a current I corresponding to the light intensity in that pixel of the image plane. Each A/D processing circuit 42 has a current controlled oscillator 44 for converting the current signal into a pulse signal of a variable frequency corresponding to the current signal. The base frequency of the oscillator 44 may be in the range of 1 MHz as indicated in the figure.

In the preferred embodiment of a differential electronic imaging system, the A/D processing circuits 42 are operated in parallel by clock signals generated by a clock section 45. The clock signals control the A/D processing circuits 42 in successive frame periods composed of a first partial period for processing an object-plus-FBP image and a second partial period for processing a fixed background pattern (FBP) image, in order to produce digital differential image data representing the FBP image subtracted from the object-plus-FBP image in each frame period. A chopper section 45a is synchronized to the clock cycle for each frame period, and operates to interrupt the object image input to obtain the FBP image input during the second partial period.

An up/down counter 46 is controlled by the clock signals of the clock section 45 and is used to count up clock pulses for the period of a pulse signal generated during the first partial period for processing the object-plus-FBP image, and to count down clock pulses for the period of a pulse signal generated during the second partial period for processing the FBP image. The difference counts, taken as digital differential image data signals for the object image alone, are output through the latch/gate 47 for successive frame periods. The output of the latch/gate 47 is transferred via a system bus 48 for storage in an optional system memory 49 and/or for direct output to a scaling section 50, 8-bit D/A converter 51, and video output circuit 52 for a video display of the object image. With this form of camera system, the system memory is not required to store the FBP, since the FBP is integrated and subtracted for each pixel during each second partial period of the frame period.

During the first partial period of each frame cycle, the PIN diode first integrates the object-plus-FBP signal, which is then immediately converted to digital form by counting up. In the second partial period, while the chopper blade obscures the image, the PIN diode integrates the FBP signal, which is converted to digital form and subtracted from the stored object-plus-FBP by counting down. At the end of the frame cycle, the resulting digital differential image data is transferred to the latch 47, where it is available for random access storage and retrieval during the next frame cycle. The digital counter is reset to zero before starting the next frame cycle. For a display, the latched image data is retrieved, scaled (e.g., four orders of magnitude of dynamic range), and D/A converted to video output signals. The 8-bit D/A converter has sufficient speed and bit accuracy for this function. The purpose of the scaling section is to allow the video output D/A converter 51, which only has and needs 8 bits of data, to display the full range of data possible from the 16-bit output of the processing circuits.

For the A/D converter at each pixel element, the current controlled oscillator 44 is a simple integrating amplifier with an output that resets to zero each time a certain level is reached. The higher the input current, the faster the amplifier reaches the reset level, and the more resets occur per unit of time. Each reset from the amplifier is counted by the digital up/down counter 46. Because the frame rate is long by comparison, a very large number of counts can be made for a moderate oscillator frequency, and thus a high bit accuracy can be achieved. For example, at a 2.5 MHz fullscale oscillator frequency, 16-bit measurements can be counted in one-half of a 20 Hz frame cycle. 16-bit absolute accuracy is difficult to obtain in such a simple A/D converter, but this configuration needs only stability and repeatability of the counts in a cycle, not absolute accuracy. Thus, parallel processing with a large number of relatively slow A/D converters achieves better accuracy and eliminates the bottleneck of serial processing of the pixel elements employed in conventional techniques. As the data is immediately digitized, there is no readout noise.

Figure 5:
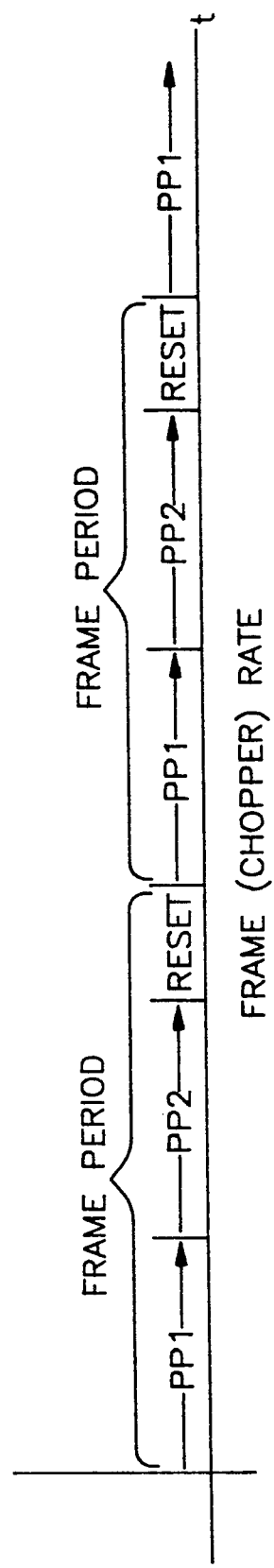
FIG. 5 is a timing diagram of the frame period and chopper timing for the differential electronic imaging system of FIG. 4.

The clock section 45 controls both the up/down counter and the memory retrieval. Precise synchronization with the chopper 45a is not necessary and, in fact, the counting cycles should trail the chopper by as much as one-quarter cycle in the thermal imaging application in order to get the maximum signal delayed by thermal response. The main requirement is that the upcount and downcount periods be precisely equal, which is easily accomplished by a digital clock. For example, as illustrated in FIG. 5, a 49.5%—49.5% duty cycle would permit 1% of the frame period to be devoted to data latching and counter reset. A key advantage of the disclosed design is that the same PIN diode, oscillator, and A/D converter are run continuously and are used both for FBP and object-plus-FBP with identical gain in each case. The PIN diode array, parallel A/D processing circuits, and latches can be combined in an integrated circuit. When the chopper is used to interrupt an object-illuminating or targeting laser, it can be isolated from the camera unit, as long as the processing frame rate corresponds to the chopper interrupt rate and the phase is adjustable.

The clock section 45 also regulates the memory retrieval and video conversion electronics, which retrieve the latched image data in a scanning fashion to produce any desired video format having a period which is an integral multiple of the frame rate. The scaler section 50 can be a simple bit-shifter which determines which part of the 16-bit digital image data is transferred to the 8-bit D/A converter for the video output. In order to expand weak signals, 6 least-significant zero bits can be added to the 16 bits, thereby allowing a dynamic range of $(16+6-7)=15$ factors of two, or a factor of 32,768. This dynamic range requires the full 16-bit random access bus, whereas, if the scaling were done at the pixel level or if a narrower range is accepted, an 8-bit bus would suffice.

Figure 6B:
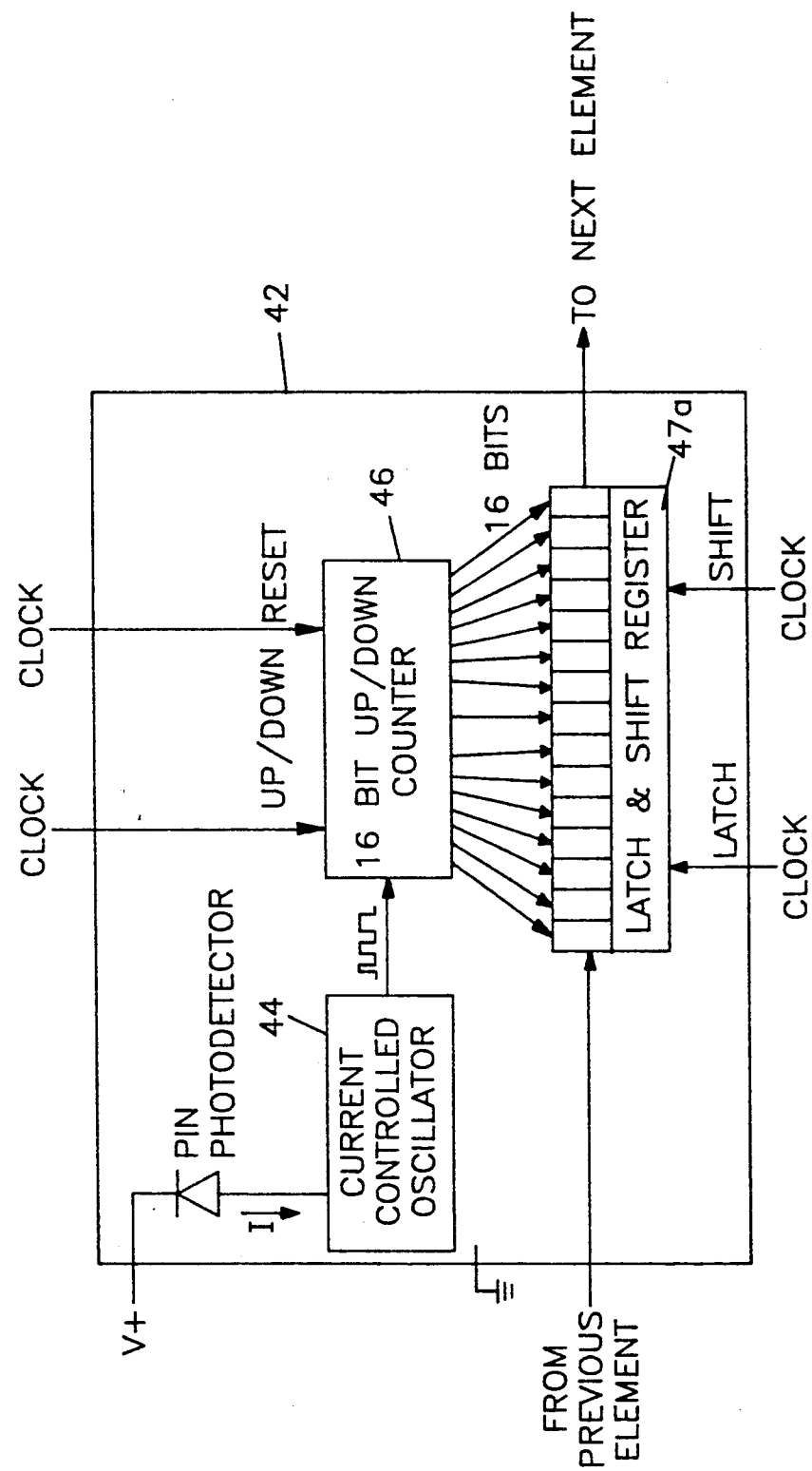

An alternate, simplified data output method is shown in FIGS. 6A and 6B. The camera array is shown connected as a parallel shift register where each pixel element in a row is connected in series to form a bucket brigade. Each element passes its latched 16-bit data to the next element in the row timed by the clock 45. Thus, each row of elements becomes a shift register passing the latched 16-bit data down to the end of the row, one element at a time. The components of the processing circuits 42 are similar to those in FIG. 4, except that a latch and shift register 47a is coupled in series between elements. The operation of the camera would be similar to a CCD camera, except that the data being passed from element to element would be digital instead of analog. Thus, the readout noise problems of CCDs would not be present. This structure also has the advantages of simplified scan electronics, since a series of random access addresses are not required, simplified gating, since each element passes data to the next element and there is no address bus, and smaller cells allowing an easier circuit configuration.

The above-described embodiments of the differential electronic imaging system may have other variations and can be used for different applications. For example, the digital parts of the camera can be eliminated by using a current integrating (analog) amplifier which can integrate up or down, in place of the current controlled oscillator 44 and up/down counter 46. The result is similar to a standard PIN diode array camera, except that this modification can integrate in two directions and is synchronized by the clock for up/down integration of the FBP and object-plus-FBP in each frame cycle.

Another modification can eliminate the chopper section 45a by periodically storing the negative of the digital FBP data in a second latch for each pixel element. In operation, the counter is reset to this latched FBP data at the start of each frame, and then the object-plus-FBP counts are added until the end of the frame. The result is latched for storage and random access retrieval as previously described. However, this modification would require the additional complexity of a bidirectional inverting latch for each pixel element, and the need to recalibrate the FBP periodically.

The wide dynamic range of the differential electronic imaging system may also be used in applications requiring high sensitivity or for faint signals against a strong background. One example is as a target locator, as illustrated in FIG. 3, in which a laser beam is scattered off a distant target and the reflected laser level is very weak, e.g., several orders of magnitude weaker than the background image even with narrow spectral filtering, either because the targeting laser is weak or because of scattered sunlight. Another example is for identifying a reflected target signal among high power sources of laser jamming. In either of these cases, the conventional diode array camera would not find the target in the laser scatter. However, in the invention, as indicated for the chopper section 45 in FIG. 4, the target can be found by chopping the laser source with each frame period. The low frame rates as previously described are not required in this application, and the half-frame containing the targeting laser scatter can easily be compared to the half-frame with the targeting laser chopped off. The target would be detected by the highly sensitive differential camera described above even if the scattered light is as low as 1/32,000 of the background in the selected spectral range. Furthermore, the image data would be in digital form for subsequent computer processing.

Another potential application would be as a communicator or locator for a pulsing target where the frame rate is the same frequency as the target pulse frequency. For example, a blinking flashlight could be located in daylight, even if its visible light was 32,000 times weaker than the background image. Similarly, a rotating (flashing) navigation satellite could be located in daytime and could be identified by its frequency, even if it were many times less bright than the daytime sky. The correct frequency and the target could be found by using the chopper section to scan through a range of frame period rates. The target is located when the system locks on to the same frequency and phase as the target pulses through this type of stroboscopic scanning.

In summary, the invention provides parallel processing of the pixels of the image plane in order to eliminate the data processing bottleneck, permit higher data conversion accuracy for better image resolution and sensitivity, and eliminate external storage and processing. The A/D converters can be implemented by a simple conversion circuit with high accuracy. Each PIN diode has very low noise and directly feeds an A/D converter, and each A/D converter internally subtracts the FBP, thus eliminating the problem of video conversion noise normally found in conventional PIN diode array cameras. The pixel signals are integrated over the full frame period (half cycle for each partial period), thereby eliminating erroneous reading of high frequency noise in the input. The FBP is updated for every frame, again using parallel processing, thus eliminating FBP drift and the need for periodic FBP recalibration. The high bit-accuracy and resolution of the imaging system of the invention can be used for a wide range of applications where a target is many times more faint than its background pattern.

The specific embodiments of the invention described herein are intended to be illustrative only, and many other variations and modifications may be made thereto in accordance with the principles of the invention. All such embodiments and variations and modifications thereof are considered to be within the scope of the invention, as defined in the following claims.

I claim:

1. A differential electronic imaging system comprising:
   an array formed with a plurality of photosensors arranged in a matrix, each of which receives input light for a respective pixel in an image plane of an input image and outputs an analog sensor signal in correspondence therewith;
   a plurality of sensor signal processing circuits, each of which is connected to a respective one of said plurality of photosensors and includes a conversion element for converting the analog sensor signal from the respective photosensor into corresponding differential image data, and output means for outputting said differential image data;
   a means for generating clock signals for controlling said sensor signal processing circuits to provide differential image data representing an object image alone, and
   display processing means for receiving the differential image data from the respective sensor signal processing circuits in order to generate a display corresponding to the input image, said means for generating clock signals for controlling said sensor signal processing circuits in successive frame periods, each frame period including a first partial period for processing an object-plus-FBP image and a second partial period for processing a fixed background pattern (FBP) image, in order to process differential image data representing the object image alone.

2. A differential electronic imaging apparatus according to claim 1, further comprising an imaging mirror for receiving a thermal image of an object thereon and subtly deforming in response thereto, a laser source for directing a laser beam at said imaging mirror, and an interferometer for combining laser light reflected from said imaging mirror with a split-off portion of the laser beam in order to generate an interference pattern corresponding to the thermal image of the object as the input image to said imaging apparatus.

3. A differential electronic imaging system comprising:

an array formed with a plurality of photosensors arranged in a matrix, each of which receives input light for a respective pixel in an image plane of an input image and outputs an analog sensor signal in correspondence therewith;

a plurality of sensor signal processing circuits, each of which is connected to a respective one of said plurality of photosensors and includes a conversion element for converting the analog sensor signal from the respective photosensor into corresponding differential image data, and output means for outputting said differential image data;

a means for generating clock signals for controlling said sensor signal processing circuits to provide differential image data representing an object image alone; and display processing means for receiving the differential image data from the respective sensor signal processing circuits in order to generate a display corresponding to the input image, said means for generating clock signals controlling said sensor signal processing circuits in successive frame periods, each frame period including a first partial period for processing an object-plus-FBP image and a second partial period for processing a fixed background pattern (FBP) image, in order to process differential image data representing the object image alone, said plurality of sensor signal processing circuits each includes integrating means for integrating the analog sensor signal of the respective photosensor in one direction during the first partial period for processing the object-plus-FBP image, and in an opposite direction during the second partial period for processing the FBP image, in order to derive the differential image data representing the object image alone.

4. A differential electronic imaging system comprising:

an array formed with a plurality of photosensors arranged in a matrix, each of which receives input light for a respective pixel in an image plane of an input image and outputs an analog sensor signal in correspondence therewith;

a plurality of sensor signal processing circuits, each of which is connected to a respective one of said plurality of photosensors and includes a conversion element for converting the analog sensor signal from the respective photosensor into corresponding differential image data, and output means for outputting said differential image data;

a means for generating clock signals for controlling said sensor signal processing circuits to provide differential image data representing an object image alone;

display processing means for receiving the differential image data from the respective sensor signal processing circuits in order to generate a display corresponding to the input image, said means for generating clock signals controlling said sensor signal processing circuits in successive frame periods, each frame period including a first partial period for processing an object-plus-FBP image and a second partial period for processing a fixed background pattern (FBP) image, in order to process differential image data representing the object image alone; and a chopper section synchronized to said means for generating clock signals, including periodic resetting thereof, in accordance with a selected frame period rate, and said chopper section operates to interrupt the object-plus-FBP image and to obtain the FBP image in correspondence with said partial periods.

5. A differential electronic imaging system according to claim 4, further comprising a laser source for illuminating a target object whit a laser beam, wherein said imaging system operates to process differential image data for reflected laser scatter from the target object.

6. A differential electronic imaging system according to claim 5, wherein said chopper section operates to control said laser source at a frequency corresponding to the frame period rate applied to said sensor signal processing circuits.

7. A differential electronic imaging system according to claim 4, wherein said chopper section operates to control said sensor signal processing circuits to scan through a range of frame period rates, in order to locate a target object emitting light pulses at a frequency corresponding therewith.

8. A differential electronic imaging system comprising:

an array formed with a plurality of photosensors arranged in a matrix, each of which receives input light for a respective pixel in an image plane of an input image and outputs an analog sensor signal in correspondence therewith;

a plurality of sensor signal processing circuits, each of which is connected to a respective one of said plurality of photosensors and includes a conversion element for converting the analog sensor signal from the respective photosensor into corresponding differential image data, and output means for outputting said differential image data;

a means for generating clock signals for controlling said sensor signal processing circuits to provide differential image data representing an object image alone; and display processing means for receiving the differential image data from the respective sensor signal processing circuits in order to generate a display corresponding to the input image, said means for generating clock signals controlling said sensor signal processing circuits in successive frame periods, each frame period including a first partial period for processing an object-plus-FBP image and a second partial period for processing a fixed background pattern (FBP) image, in order to process differential image data representing the object image alone, said plurality of sensor signal processing circuits each having a PIN diode as the respective photosensor for generating a current signal corresponding to the analog sensor signal, a current controlled oscillator circuit receiving said current signal from said PIN diode and generating a pulse signal of a frequency corresponding to said current signal, an up/down counter controlled in accordance with the clock signals of said means for generating clock signals for counting up in correspondence with the frequency of a pulse signal generated during said first partial period for processing an object-pulse-FBP image, and for counting down in correspondence with the frequency of a pulse signal generated during said second partial period for processing an FBP image, and said output means is a latch for latching a resulting count representing digital differential image data for each frame period based upon said counting up and counting down.

9. A differential electronic imaging system according to claim 8, further comprising a system bus connected to said latch, and a system memory connected to said bus for storing and retrieving the latched differential image data from said plurality of sensor signal processing circuits.

10. A differential electronic imaging system according to claim 9, further comprising a scaling section connected to receive digital differential image data retrieved on said system bus, and a digital-to-analog (D/A) converter for converting retrieved digital differential image data into analog signals for generating a display.

11. A differential electronic imaging system according to claim 8, wherein said output means is a latch and shift register, and the latch and shift registers of said A/D processing circuits are connected in a parallel shift register configuration.

12. A differential electronic imaging system comprising:
an array formed with a plurality of photosensors arranged in a matrix, each of which receives input light for a respective pixel in an image plane of an input image and outputs an analog sensor signal in correspondence therewith;
a clock for generating clock signals for controlling said sensor signal processing circuits in successive frame periods, each frame period including a first partial period for processing an object-plus-FBP image and a second partial period for processing a fixed background pattern (FBP) image, in order to derive the differential image data representing the object image alone;
a plurality of A/D processing circuits, each of which is connected to a respective one of said plurality of photosensors and includes an A/D conversion element for converting the analog sensor signal of the respective photosensor to first digital image data during the first partial period for processing the object-plus-FBP image, to second digital image data during the second partial period for processing the FBP image, in order to derive the differential image data representing the object image alone, and output means for outputting said differential image data; and
display processing means for receiving the differential image data from the respective sensor signal processing circuits in order to generate a display corresponding to the input image.

13. A differential electronic imaging system comprising:
an array formed with a plurality of photosensors arranged in a matrix, each of which receives input light for a respective pixel in an image plane of an input image and outputs an analog sensor signal in correspondence therewith;
a clock for generating clock signals for controlling said sensor signal processing circuits in successive frame periods, each frame period including a first partial period for processing an object-plus-FBP image and a second partial period for processing a fixed background pattern (FBP) image, in order to derive the differential image data representing the object image alone;
a plurality of A/D processing circuits, each of which is connected to a respective one of said plurality of photosensors and includes an A/D conversion element for converting the analog sensor signal of the respective photosensor to first digital image data during the first partial period for processing the object-plus-FBP image, to second digital image data during the second partial period for processing the FBP image, in order to derive the differential image data representing the object image alone, and output means for outputting said differential image data;
display processing means for receiving the differential image data from the respective sensor signal processing circuits in order to generate a display corresponding to the input image; and
a laser source for illuminating a target object with a laser beam, wherein said imaging system operates to process differential image data for reflected laser scatter from the target object.

14. A differential electronic imaging system comprising:
an array formed with a plurality of photosensors arranged in a matrix, each of which receives input light for a respective pixel in an image plane of an input image and outputs an analog sensor signal in correspondence therewith;
a clock for generating clock signals for controlling said sensor signal processing circuits in successive frame periods, each frame period including a first partial period for processing an object-plus-FBP image and a second partial period for processing a fixed background pattern (FBP) image, in order to derive the differential image data representing the object image alone;
a plurality of A/D processing circuits, each of which is connected to a respective one of said plurality of photosensors and includes an A/D conversion element for converting the analog sensor signal of the respective photosensor to first digital image data during the first partial period for processing the object-plus-FBP image, to second digital image data during the second partial period for processing the FBP image, in order to derive the differential image data representing the object image alone, and output means for outputting said differential image data;
display processing means for receiving the differential image data from the respective sensor signal processing circuits in order to generate a display corresponding to the input image; and
a chopper section synchronized to said clock, including periodic resetting thereof, in accordance with a selected frame period rate, and said chopper section operates to interrupt the object-plus-FBP image and to obtain the FBP image in correspondence with said partial periods.

15. A differential electronic imaging system according to claim 14, wherein said chopper section operates to control said laser source at a frequency corresponding to the frame period rate applied to said sensor signal processing circuits.

16. A differential electronic imaging system according to claim 14, wherein said chopper section operates to control said A/D processing circuits to scan through a range of frame period rates, in order to locate a target object emitting light pulses at a frequency corresponding therewith.

17. A differential electronic imaging system comprising:

an array formed with a plurality of photosensors arranged in a matrix, each of which receives input light for a respective pixel in an image plane of an input image and outputs an analog sensor signal in correspondence therewith;

a clock for generating clock signals for controlling said sensor signal processing circuits in successive frame periods, each frame period including a first partial period for processing an object-plus-FBP image and a second partial period for processing a fixed background pattern (FBP) image, in order to derive the differential image data representing the object image alone;

a plurality of A/D processing circuits, each of which is connected to a respective one of said plurality of photosensors and includes an A/D conversion element for converting the analog sensor signal of the respective photosensor to first digital image data during the first partial period for processing the object-plus-FBP image, to second digital image data during the second partial period for processing the FBP image, in order to derive the differential image data representing the object image alone, and output means for outputting said differential image data; and display processing means for receiving the differential image data from the respective sensor signal processing circuits in order to generate a display corresponding to the input image, said plurality of A/D processing circuits each includes a PIN diode as the respective photosensor for generating a current signal corresponding to the analog sensor signal, a current controlled oscillator circuit receiving said current signal from said PIN diode and generating a pulse signal of a frequency corresponding to said current signal, an up/down counter controlled in accordance with the clock signals of said clock means for counting up in correspondence with the frequency of a pulse signal generated during said first partial period for processing an object-plus-FBP image, and for counting down in correspondence with the frequency of a pulse signal generated during said second partial period for processing an FBP image, and said output means is a latch for latching a resulting count representing digital differential image data for each frame period based upon said counting up and counting down.

18. A differential electronic imaging system according to claim 17, further comprising a system bus connected to said latch, and a system memory connected to said bus for storing and retrieving the latched differential image data from said plurality of sensor signal processing circuits.

19. A differential electronic imaging system according to claim 18, further comprising a scaling section connected to receive digital differential image data retrieved on said system bus, and a digital-to-analog (D/A) converter for converting retrieved digital differential image data into analog signals for generating a display.

20. A differential electronic imaging system according to claim 17, wherein said output means is a latch and shift register, and the latch and shift registers of said A/D processing circuits are connected in a parallel shift register configuration.

21. A method for differential electronic imaging of an object comprising the steps of:

detecting the object using an array formed with a plurality of photosensors arranged in a matrix, each of which receives input light for a respective pixel in an image plane of an input image and outputs an analog sensor signal in correspondence therewith;

processing the analog sensor signals from said photosensor array operating a plurality of sensor signal processing circuits in parallel, each of which is connected to a respective one of said plurality of photosensors and includes a conversion element for converting the analog sensor signal from the respective photosensor into corresponding differential image data;

generating clock signals for controlling said sensor signal processing circuits in successive frame periods, each frame period including a first partial period for processing an object-plus-FBP image and a second partial period for processing a fixed background pattern (FBP) image, in order to derive the differential image data representing the object image alone; and outputting said differential image data.

22. A method for differential electronic imaging according to claim 21, further comprising the steps of using a laser source for illuminating a target object with a laser beam, and operating said imaging system to process differential image data for reflected laser scatter from the target object.

23. A method for differential electronic imaging according to claim 22, wherein said using step includes controlling said laser source at a frequency corresponding to the frame period rate applied to said sensor signal processing circuits.

24. A method for differential electronic imaging according to claim 21, further comprising the steps of using an imaging mirror for receiving a thermal image of an object thereon and subtly deforming in response thereto, and a laser source and interferometer for generating an interference pattern corresponding to the thermal image of the object as the input image.

25. A method for differential electronic imaging of an object comprising the steps of:

detecting the object using an array formed with a plurality of photosensors arranged in a matrix, each of which receives input light for a respective pixel in an image plane of an input image and outputs an analog sensor signal in correspondence therewith;

processing the analog sensor signals from said photosensor array operating a plurality of sensor signal processing circuits in parallel, each of which is connected to a respective one of said plurality of photosensors and includes a conversion element for converting the analog sensor signal from the respective photosensor into corresponding differential image data;

generating clock signals for controlling said sensor signal processing circuits in successive frame periods, each frame period including a first partial period for processing an object-plus-FBP image and a second partial period for processing a fixed background pattern (FBP) image, in order to derive the differential image data representing the object image alone; and outputting said differential image data, said processing step in parallel includes operating said plurality of sensor signal processing circuits to integrate the analog sensor signal of the respective photosensor in one direction during the first partial period for processing the object-plus-FBP image, and in an opposite direction during the second partial period for processing the FBP image, in order to derive the differential image data representing the object image alone.

26. A method for differential electronic imaging of an object comprising of steps of:

detecting the object using an array formed with a plurality of photosensors arranged in a matrix, each of which receives input light for a respective pixel in an image plane of an input image and outputs an analog sensor signal in correspondence therewith;

processing the analog sensor signals from said photosensor array operating a plurality of sensor signal processing circuits in parallel, each of which is connected to a respective one of said plurality of photosensors and includes a conversion element for converting the analog sensor signal from the respective photosensor into corresponding differential image data;

generating clock signals for controlling said sensor signal processing circuits in successive frame periods, each frame period including a first partial period for processing an object-plus-FBP image and a second partial period for processing a fixed background pattern (FBP) image, in order to derive the differential image data representing the object image alone;

operating said sensor signal processing circuits to scan through a range of frame period rates, in order to locate a target object emitting light pulses at a frequency corresponding therewith; and outputting said differential image data.

* * * * *